United States Patent
Robbecke et al.

(10) Patent No.: US 11,524,373 B2
(45) Date of Patent: Dec. 13, 2022

(54) DEVICE FOR THE AUTOMATIC MANUFACTURE OF SCREW CONNECTIONS BY MEANS OF A SCREW

(71) Applicants: HELLA GMBH & CO KGAA, Lippstadt (DE); HELLA SATURNUS SLOVENIJA D.O.O, Ljubjana (SI)

(72) Inventors: Thomas Albert Robbecke, Erwitte (DE); Miguel Lebrato-Rastrojo, Paderborn (DE); Ingo Engler, Soest (DE); Jaka Jaklic, Logatec (SI); Martin Slivnik, Zgornje Gorje (SI); Kristjan Ficko, Kocevska Reka (SI)

(73) Assignee: HELLA GMBH & CO KGAA, Lippstadt (DE)

(*) Notice: Subject to any disclaimer, the term of this patent is extended or adjusted under 35 U.S.C. 154(b) by 0 days.

(21) Appl. No.: 17/251,729

(22) PCT Filed: Jun. 13, 2019

(86) PCT No.: PCT/EP2019/065599
§ 371 (c)(1),
(2) Date: Dec. 11, 2020

(87) PCT Pub. No.: WO2019/238883
PCT Pub. Date: Dec. 19, 2019

(65) Prior Publication Data
US 2021/0213574 A1    Jul. 15, 2021

(30) Foreign Application Priority Data

Jun. 14, 2018 (DE) .......................... 202018002819.3
Nov. 23, 2018 (DE) .......................... 102018129533.2

(51) Int. Cl.
*B23P 19/06*  (2006.01)
*B25J 11/00*  (2006.01)
(Continued)

(52) U.S. Cl.
CPC ............ *B23P 19/06* (2013.01); *B25J 11/005* (2013.01); *B25J 15/0019* (2013.01);
(Continued)

(58) Field of Classification Search
CPC ...... B23P 19/06; B25J 11/005; B25J 15/0019; B25J 19/02; Y10T 29/49963; B25B 23/005; B25B 23/105; B25B 23/08; B25B 23/12
See application file for complete search history.

(56) References Cited

U.S. PATENT DOCUMENTS

| | | | | |
|---|---|---|---|---|
| 1,539,782 A | * | 5/1925 | Stansell | ................ B25B 23/005 81/451 |
| 3,783,491 A | * | 1/1974 | Meitz | ..................... B25B 23/04 81/431 |

(Continued)

FOREIGN PATENT DOCUMENTS

| | | |
|---|---|---|
| DE | 202013105501 U1 | 3/2015 |
| DE | 102013020138 A1 | 6/2015 |

(Continued)

OTHER PUBLICATIONS

RD489075A, Jan. 2005.*
International Search Report dated Sep. 5, 2019; International Application No. PCT/EP2019/065599.

*Primary Examiner* — Jermie E Cozart
(74) *Attorney, Agent, or Firm* — Dinsmore & Shohl LLP

(57) ABSTRACT

A device for the automatic manufacture of screw connections by a screw includes a motion system with which the screw can be led to the components to be connected. The screw is taken up by an automatic screwing arranged on the motion system. A protective sleeve is arranged so that it can be moved with the automatic screwing unit. The protective
(Continued)

sleeve acts as protection, surrounds the screw, and is arranged out of contact with one of the components to be connected.

20 Claims, 2 Drawing Sheets

(51) Int. Cl.
*B25J 15/00* (2006.01)
*B25B 23/00* (2006.01)
*B25B 23/08* (2006.01)
*B25J 19/02* (2006.01)
*B25B 23/10* (2006.01)

(52) U.S. Cl.
CPC ............ *B25B 23/005* (2013.01); *B25B 23/08* (2013.01); *B25B 23/105* (2013.01); *B25J 19/02* (2013.01); *Y10T 29/49963* (2015.01)

(56) References Cited

U.S. PATENT DOCUMENTS

| | | | | |
|---|---|---|---|---|
| 4,058,884 A | * | 11/1977 | Lydon | .................... B25B 21/00 |
| | | | | 81/451 |
| 4,637,776 A | * | 1/1987 | Saito | ...................... B25B 23/08 |
| | | | | 414/627 |
| 2005/0247166 A1 | * | 11/2005 | Sasaki | .................... B23P 19/06 |
| | | | | 81/54 |

FOREIGN PATENT DOCUMENTS

| | | |
|---|---|---|
| DE | 102014001460 A1 | 8/2015 |
| DE | 202016001261 U1 | 5/2017 |
| DE | 102016209446 A1 | 11/2017 |
| JP | S61209829 A | 9/1986 |
| WO | 2015106757 A2 | 7/2015 |

* cited by examiner

DEVICE FOR THE AUTOMATIC MANUFACTURE OF SCREW CONNECTIONS BY MEANS OF A SCREW

CROSS REFERENCE TO RELATED APPLICATIONS

This application is the U.S. national stage of PCT/EP2019/065599 filed Jun. 13, 2019, which claims priority of German patent application 202018002819.3 filed Jun. 14, 2018, and German patent application 102018129533.2 filed Nov. 23, 2018 both of which are hereby incorporated by reference in their entirety.

FIELD OF THE INVENTION

The present invention relates to a device for the automatic manufacture of screw connections by means of a screw, where the device has a motion system with which the screw can be led to the components to be connected and where the screw is taken up at an automatic screwing unit, and the automatic screwing unit is arranged at the motion system.

BACKGROUND ON THE INVENTION

Devices for the automatic manufacture of screw connections are known from the state of the art and, to use an example, DE 10 2014 001 460 A1 demonstrates a device with a motion system that is implemented as an articulated robot and at a mounting end of the motion system an automatic screwing is mounted in order to handle screws in the corresponding manner and to produce, to name an example, screw connections between two components. Modern workstations, especially those for semi-automatic assembly, and the associated movement of material can be embodied as what are referred to as collaborative workstations where a human works together with a robot by carrying out work steps alternately. With work stations of this kind, it must be ensured that no injuries are caused, especially when the robot moves screws at its mounting end, screws that on account of the screw geometry and the forces arising from the motion system can cause injury to the human. In order to avoid such collisions, sophisticated optical recognition systems are frequently required, where even then there is, for example, one exposed screw that can cause injuries if the operator makes an uncontrolled movement.

On account of the increasing number of collaborative workstations with robots and operating staff, there is an increasing need to create simply designed protective devices which can be effectively used to prevent injury to the operator.

SUMMARY OF THE INVENTION

The task of the invention is the embodiment of a device for the automatic manufacture of screw connections by means of a screw that is handled by a motion system, where the device is to be designed as a collaborative workstation and reliable avoidance of injuries to the operator from the screw being moved by the motion system is to be achieved.

This purpose is achieved based on a device in as described herein with the characteristic features. Advantageous embodiments of the invention are also described.

The invention includes the technical contribution that the device has a protective sleeve that is arranged to be moved along with the automatic screwing unit and that surrounds the screw in a protective manner in an arrangement out of contact with one of the components to be connected.

The core idea of the invention is to house in the screw in an arrangement at the motion system, specifically for the length of time in which the screw is being handled during which the screw is no located in or immediately above at least one component that is to be connected to another with the screw. With such a protective sleeve, a sensor system can be built up in a simple manner that is based on purely tactile recognition of a collision especially with the limbs of the operator. In this respect, the operator cannot, however, touch the screw in the first place as the motion of the screw can be shut down beforehand by means of the motion system. For this purpose, simple tactile recognition via the protective sleeve is sufficient without the need for sophisticated non-contact collision recognition systems. In this context, the protective sleeve can be round, square or designed with any other cross-section shape and be made of plastic, metal glass or a similar material. The inner diameter of the protective sleeve is, for example, is designed to be slightly larger that the diameter of the head of the screw.

To facilitate the design of such a sensor system, the protective sleeve can be arranged in a longitudinal extension of the screw such that it can be moved linearly at the motion system. In this respect, another advantage can be obtained from arranging the protective sleeve movably at the motion system by means of a mounting element, where the mounting element includes an electric sensor by means of which a movement of the protective sleeve in a longitudinal extension of the screw caused by externally applied forces can be sensed. If, for example, the operator's hand comes into contact with the lower opening side of the protective sleeve, the protective sleeve is shifted in relation to the mounting point of the motion system, specifically in the mounting element, a switching signal of the electric sensor is triggered and the motion system is brought to a standstill. It should be noted in this context that several factors influence the time it takes for the motion of the screw to come to a standstill, such as the time-lag of the robot, the time-lag of the sensor and the length of the screw that likewise have to be taken into consideration. For this reason, it is advantageous for the protective sleeve to have a length determined in such a way that the protective sleeve projects beyond the screw in an arrangement on the side of the screw tip out of contact with one of the components to be connected. For example, the protective sleeve can project beyond the screw on the side of the screw tip by at least 90 mm. If contact between the operator and with the opening side of the protective sleeve is detected by the sensor located in an arrangement in or at the mounting element being triggered, the robot is able, assuming a typical velocity of 250 mm per second, to come to a stop within a path of around 50 mm. The time-lag arising from recognition by the electric sensor gives rise a further distance of 20 mm and the screw might, for example, be 15 mm in length. With a reserve of around 5 mm, this consequently results in a total of 90 mm by which the sleeve must project beyond the far end of the the screw in order to avoid its coming into contact with the operator (for example, the operator's hand) even when the screw is moving at full velocity in an arrangement on the motion system.

For the protective sleeve to take up, in normal operation, the desired position relative to the screw specifically along the longitudinal extension, the protective sleeve may be pretensioned with a pretensioning force by means of the mounting element at the motion system into the position in which the protective sleeve projects beyond the screw in an arrangement out of contact with one of the components to be connected on the side of the screw tip. The mounting element may, for example, be a pneumatic cylinder and if the protective sleeve has shifted, the pneumatic cylinder can be correspondingly pressurized to put the protective sleeve back into the desired position. In addition, controlled pressurization of a pneumatic cylinder to form the mounting element can contribute to maintaining a slight pretensioning of the protective sleeve in the desired position.

A further advantage is achieved if the protective sleeve has a ring cross-section with a cross-section area from 40 mm$^2$ to 100 mm$^2$ and/or from 40 mm$^2$ to 50 mm$^2$ and/or from 40 mm$^2$ to 45 mm$^2$.

By selecting in a targeted manner a minimum cross-section area, surface pressure, for example on the skin of the operator's extremities, can be kept under a certain limit, for example a maximum force of less than 190 N/cm$^2$ according to ISO/TS 15066.

Preferentially, the protective sleeve has a defined breaking point in the form of a local weakening in the hardness of the protective sleeve, that can be designed as a radial notch around the sleeve. Firstly, such a defined breaking point acts, in the event of a collision for example with the operator's hand, to limit potential damage to the device in accordance with the invention to the breaking off of the protective sleeve and thus to protect more sophisticated components, especially the mounting element connected to the protective sleeve. Furthermore, providing a yielding defined breaking point keeps the operator's risk of injury to a minimum in the event of a collision. The defined breaking point can also be created by means of a section with a with a lower level of hardness in a certain locally restricted area or a perforation, i.e. a geometrical/structural weakness.

A special advantage comes about when the mounting element for mounting the protective sleeve at the motion system is formed by means of a pneumatic cylinder, in addition there is the possibility of likewise mounting the automatic screwing unit by means of a pneumatic cylinder at the motion system, where both pneumatic cylinders facilitate a movement of the protective sleeve or the screw in a longitudinal extension of the screw.

Another advantage is achieved in the motion system is formed by means of an articulated robot. A carrier plate can be provided at the mounting end of the motion system, especially the articulated robot, for mounting the automatic screwing unit and for mounting the protective sleeve, in particular the motion system and also the components to be connected can be mounted on a joint base plate. A mounting head can serve to connect the carrier plate with the motion system and the screw can be mounted via a screwdriver tool on the automatic screwing unit, for example by correspondingly magnetizing the mounting end of the screwdriver tool and the screw.

BRIEF DESCRIPTION OF THE DRAWINGS

Additional measures to improve the invention are depicted in detail below together with the description of a preferred invention embodiment example using the figures. It shows.

DETAILED DESCRIPTION ON THE PREFERRED EMBODIMENT

Figure 1:
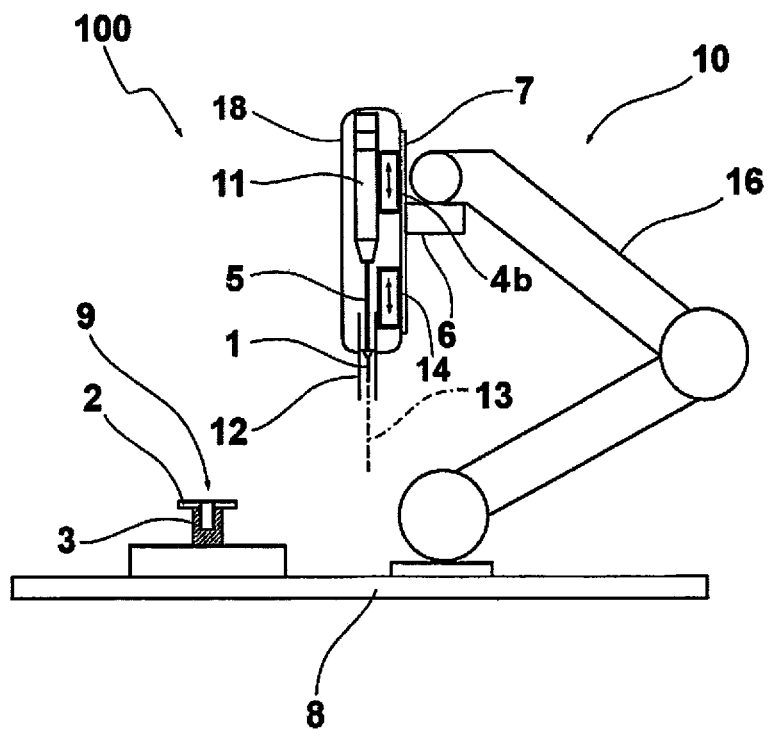
FIG. 1 is a schematic view of a device 100 with a protective sleeve in according with the invention.

FIG. 1 shows in a schematic view the device 100 for the automatic manufacture of screw connections by means of a screw 1 and as an essential component the device 100 has a motion system 10 in the form of an articulated robot 16. A carrier plate 7 with a housing 18 and an automatic screwing unit 11 arranged therein is mounted at a mounting head 6 and a screw 1 is mounted at the automatic screwing unit 11 via a screwdriver tool 5, a screw which the components 2 and 3 (shown schematically) can be screwed together by the screw 1 being screwed into the screw hole 9.

To this end, the screw 1 is first moved over the screw hole 9 by means of a corresponding movement of the articulated robot 16, where the screw 1 is surrounded by a protective sleeve 12 arranged on the mounting element 14 and the articulated robot 16 moves the unit mounted at the mounting head 5 into such a position above the screw hole 9 until there are only a few more millimeters, specifically 0.5 mm to 1 mm between the upper side of the component 2 and the lower end surface of the protective sleeve 12. Subsequently, activation of a pneumatic cylinder 4b can shift automatic screwing unit 11 in the longitudinal extension 13, such that the screw 1 finally runs out of the lower opening of the protective sleeve 12 and screws the two components 2 and 3 to each other. This procedure forms the usual screwing procedure for screwing together the two components 2 and 3, which are, to show an example, mounted on a common base plate 8 connected to the motion system 10.

If, during the free movement of the articulated robot 16, there is a collision with the protective sleeve 12, for example if the protective sleeve 12 is touched by the hand of the operator, the protective sleeve 12 shifts in relation to the screw 1 in longitudinal direction 13, which causes the movement of the articulated robot 16 to be brought to an immediate standstill. This makes it possible to effectively prevent a human, and human extremities in particular, from coming into context with the screw 1.

Figure 2:
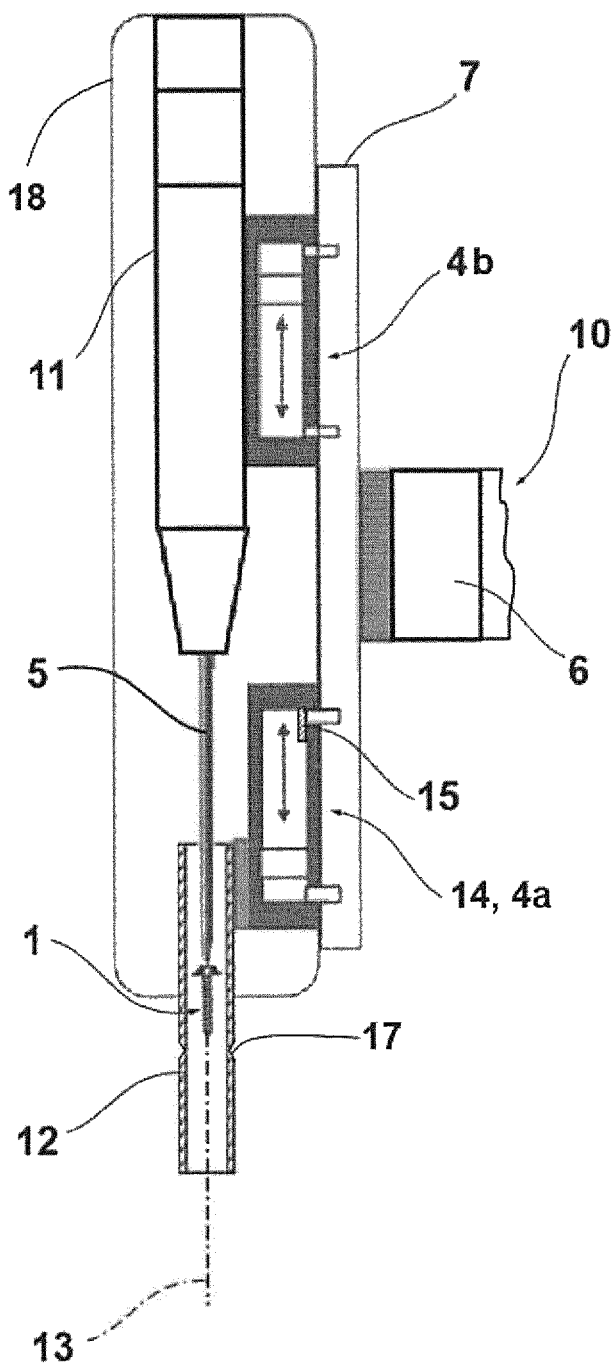
FIG. 2 is a detailed view of the components mounted at the mounted head of the motion system comprising the automatic screwing unit, the screwdriver tool, the screw and specifically the protective sleeve.

FIG. 2 shows a detailed view of the arrangement of the automatic screwing unit 11 and the protective sleeve 12 at the mounting head 6 of the motion system 10, for which purpose a carrier place 7 has been provided. A first pneumatic cylinder 4b is arranged at the carrier plate 7 through which the automatic screwing unit 11 is fastened to the carrier plate 7 and a mounting unit 14 has been provided in the form of another pneumatic cylinder 4a, by means of which the protective sleeve 12 is mounted at the carrier plate 7. The mounting element 14 includes an electric sensor 15 and if a corresponding touch shifts the protective sleeve 12 upwards in the longitudinal extension 13, such shift is recognized by the electric sensor 15 and the movement of the motion system 10 is directly interrupted.

The mounting element 14 can, as an alternative to the design as pneumatic cylinder 4a, also be designed as a coil spring, so that the protective sleeve 12 can also be pretensioned in the position shown by a coil spring. If the protective sleeve 12 is subject to a force applied to the lower face end, the coil spring can be compressed and if the force ceases to be applied, the coil spring will bring the protective sleeve back into the desired position. This also provides the option of axially pretensioning the protective sleeve 12 in the direction of the longitudinal extension 13 by means of a coil spring.

The screw 1, that is located at the end of a screwdriver tool 5, which in turn is connected with the automatic screwing unit 11 and can be set into rotation, also remains during this process arranged within the protective sleeve 12 even in the event of a collision between the protective sleeve 12 with a foreign body. For this purpose, the protective sleeve 12 projects beyond the screw 1 on the lower side of the screw tip, for example by 90 mm, so that all braking and lag times arising between the time the collision is identified and the movement of the motion system 10 finally coming to a standstill are taken into consideration. By the time the screw tip of the screw 1 protrudes from the bottom side of the protective sleeve 12, the movement of the motion system 10 has efficiently been stopped.

The mounting element 14 can also be formed by a pneumatic cylinder 4a that in particular is slightly pressurized in order to bring the protective sleeve 12 back into the desired position, specifically the one shown, in the event of a collision and a shift towards the automatic screwing unit 11.

The forward movement when screwing the screw 1 into components 2 and 3 is effected by pressurizing the pneumatic cylinder 4b so that the actual shift in the position of the screw 1 during the screwing procedure into components 2 and 3 does not have to be tracked by the motion system 10. In doing so, the protective sleeve 12 can maintain the customary position relative to the carrier plate 7, and the automatic screwing unit 11 and therefore also the screwdriver tool 5 and the screw 1 shifting downwards in a vertical direction facilitates the procedure of screwing in the screw 1. This movement is only activated, however, when the control system of the motion system 10 detects the target position at which the lower side of the protective sleeve 12 is arranged, for example, only 0.5 mm or 1 mm above the component 2. In this respect, a collision with an operator's body part can be ruled out.

As a result, this means that only a single, simply designed electric sensor 15 is sufficient to reliable prevent a collision of the screw 1 with an operator, specifically also by means of the protective sleeve 12 designed as a sheath, that completely encloses the screw 1. If there is no screw 1 arranged at screwdriver tool 5, the means that the free end of the screwdriver tool 5 is located within the protective sleeve 12, which also makes it possible to avoid a collision with screwdriver tool 5 and the end that might be sharp-edged for example. The protective sleeve 12 can, for example, be manufactured from plastic, specifically transparent plastic.

Preferentially, the protective sleeve 12 has a defined breaking point 17 radially running around its circumference, along which the protective sleeve 12 fails, especially in the event of an unintended collision with a body part of the operator. This reduces the risk of damage to more complex components of the device 100, specifically at the mounting element 14 and at the screwdriver tool 5. The defined breaking point 17 is designed as a local weakening in the hardness of the protective sleeve 12. In FIG. 2, the defined breaking point consists of a groove radially running around the protective sleeve 12, along which groove the protective sleeve can break or kink in the event of overload. Preferentially, the defined breaking point is arranged in an axial direction in the upper half of the section of the protective sleeve 12 protruding from the housing 18, specifically at an axial distance of 30 mm to the housing 18. Alternatively, the defined breaking point 17 can also be designed in the form of a local perforation in the protective sleeve 12.

The design of the invention is not limited to the preferred embodiment specified here. Rather, a number of variants are conceivable, which make use of the present solution even in designs of a fundamentally different type. All of the features and/or advantages arising from the claims, description or drawings, including design details, physical layout and process steps, may be vital to the invention both by themselves and in a wide variety of combinations.

REFERENCE NUMERAL LIST

100 Device
1 Screw
2 Component
3 Component
4a, 4b Pneumatic cylinder
5 Screwdriver tool
6 Mounting head
7 Carrier plate
8 Base plate
9 Screw hole
10 Motion system
11 Automatic screwing unit
12 Protective sleeve
13 Longitudinal extension
14 Mounting element
15 Electronic sensor
16 Articulated robot
17 Defined breaking point
18 Housing

The invention claimed is:

1. A device for the automatic manufacture of screw connections by a screw, the device comprising:
   a motion system with which a screw can be led to components to be connected;
   an automatic screwing unit arranged on the motion system and operable to take up the screw;
   a protective sleeve out of contact with the screw and arranged so as to be movable with the automatic screwing unit, the protective sleeve acting as protection and surrounding the screw, while the screw being out of contact with one of the components to be connected; and
   a mounting element movably mounting the protective sleeve on the motion system, the mounting element comprising an electric sensor operable to sense a movement of the protective sleeve in a longitudinal extension of the screw caused by externally applied forces.

2. The device in accordance with claim 1, wherein the protective sleeve is arranged in a longitudinal extension of the screw such that the protective sleeve is linearly movable by the motion system.

3. The device in accordance with claim 1, wherein the protective sleeve has a length determined such that the protective sleeve projects beyond the screw in an arrangement out of contact with one of the components to be connected on a side of a tip of the screw.

4. The device in accordance with claim 1, wherein the mounting element pretensions the protective sleeve with a pretensioning force into the position in which the protective sleeve projects beyond the screw in an arrangement out of contact with one of the components to be connected on as side of a tip of the screw.

5. The device in accordance with claim 1, wherein the motion system comprises an articulated robot.

6. The device in accordance with claim 1, wherein the protective sleeve extends beyond the screw by at least 90 mm on the side of the screw tip.

7. The device in accordance with claim 1, wherein the protective sleeve has a ring cross-section with a cross-section area from 40 mm$^2$ to 100 mm$^2$.

8. The device in accordance with claim 1, wherein the protective sleeve has a defined breaking point, the defined breaking point being formed as a local weakening in a hardness of the protective sleeve.

9. A device for the automatic manufacture of screw connections by a screw, the device comprising:
- a motion system with which a screw can be led to components to be connected;
- an automatic screwing unit arranged on the motion system and operable to take up the screw; and
- a protective sleeve out of contact with the screw and arranged so as to be movable with the automatic screwing unit, the protective sleeve acting as protection and surrounding the screw, while the screw being out of contact with one of the components to be connected,
- wherein the protective sleeve has a length determined such that the protective sleeve projects beyond the screw in an arrangement out of contact with one of the components to be connected on a side of a tip of the screw, and
- wherein the protective sleeve extends beyond the screw by at least 90 mm on the side of the screw tip.

10. The device in accordance with claim 9, further comprising a mounting element movably mounting the protective sleeve on the motion system, the mounting element comprising an electric sensor operable to sense a movement of the protective sleeve in a longitudinal extension of the screw caused by externally applied forces.

11. A device for the automatic manufacture of screw connections by a screw, the device comprising:
- a motion system with which a screw can be led to components to be connected;
- an automatic screwing unit arranged on the motion system and operable to take up the screw; and
- a protective sleeve out of contact with the screw and arranged so as to be movable with the automatic screwing unit, the protective sleeve acting as protection and surrounding the screw, while the screw being out of contact with one of the components to be connected,
- wherein the protective sleeve has a ring cross-section with a cross-section area from 40 mm$^2$ to 100 mm$^2$.

12. The device in accordance with claim 11, wherein the protective sleeve has a ring cross-section with a cross-section area from 40 mm$^2$ to 50 mm$^2$.

13. The device in accordance with claim 11, wherein the protective sleeve has a ring cross-section with a cross-section area from 40 mm$^2$ to 45 mm$^2$.

14. The device in accordance with claim 11, further comprising a mounting element movably mounting the protective sleeve on the motion system, the mounting element comprising an electric sensor operable to sense a movement of the protective sleeve in a longitudinal extension of the screw caused by externally applied forces.

15. A device for the automatic manufacture of screw connections by a screw, the device comprising:
- a motion system with which a screw can be led to components to be connected;
- an automatic screwing unit arranged on the motion system and operable to take up the screw;
- a protective sleeve out of contact with the screw and arranged so as to be movable with the automatic screwing unit, the protective sleeve acting as protection and surrounding the screw, while the screw being out of contact with one of the components to be connected,
- wherein the protective sleeve has a defined breaking point, the defined breaking point being formed as a local weakening in a hardness of the protective sleeve.

16. The device in accordance with claim 15, further comprising a mounting element movably mounting the protective sleeve on the motion system, the mounting element comprising an electric sensor operable to sense a movement of the protective sleeve in a longitudinal extension of the screw caused by externally applied forces.

17. A device for the automatic manufacture of screw connections by a screw, the device comprising:
- a motion system with which a screw can be led to components to be connected;
- an automatic screwing unit arranged on the motion system and operable to take up the screw;
- a protective sleeve out of contact with the screw and arranged so as to be movable with the automatic screwing unit, the protective sleeve acting as protection and surrounding the screw, while the screw being out of contact with one of the components to be connected,
- wherein a mounting element for mounting the protective sleeve on the motion system comprises a pneumatic cylinder.

18. The device in accordance with claim 17, wherein the protective sleeve extends beyond the screw by at least 90 mm on the side of the screw tip.

19. A device for the automatic manufacture of screw connections by a screw, the device comprising:
- a motion system with which a screw can be led to components to be connected;
- an automatic screwing unit arranged on the motion system and operable to take up the screw;
- a protective sleeve out of contact with the screw and arranged so as to be movable with the automatic screwing unit, the protective sleeve acting as protection and surrounding the screw, while the screw being out of contact with one of the components to be connected,
- wherein the automatic screwing device is arranged on the motion system by a pneumatic cylinder such that the automatic screwing device can be moved in a stroke movement.

20. The device in accordance with claim 19, wherein the protective sleeve extends beyond the screw by at least 90 mm on the side of the screw tip.

* * * * *